United States Patent
Nakashima et al.

(10) Patent No.: US 11,414,558 B2
(45) Date of Patent: Aug. 16, 2022

(54) PHOTOCURABLE INKJET PRINTING INK COMPOSITION

(71) Applicant: SAKATA INX CORPORATION, Osaka (JP)

(72) Inventors: Okinori Nakashima, Osaka (JP); Takuya Myose, Osaka (JP); Kazuhiro Fuke, Osaka (JP); Yuki Yoshida, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 17/046,171

(22) PCT Filed: Apr. 1, 2019

(86) PCT No.: PCT/JP2019/014486
§ 371 (c)(1),
(2) Date: Oct. 8, 2020

(87) PCT Pub. No.: WO2019/198556
PCT Pub. Date: Oct. 17, 2019

(65) Prior Publication Data
US 2021/0155813 A1    May 27, 2021

(30) Foreign Application Priority Data
Apr. 11, 2018  (JP) .............................. JP2018-076345

(51) Int. Cl.
| | | |
|---|---|---|
| *C09D 11/10* | (2014.01) | |
| *C09D 11/101* | (2014.01) | |
| *C09D 11/107* | (2014.01) | |
| *C09D 11/322* | (2014.01) | |
| *C09D 11/36* | (2014.01) | |
| *B41J 2/01* | (2006.01) | |

(52) U.S. Cl.
CPC .......... *C09D 11/101* (2013.01); *C09D 11/107* (2013.01); *C09D 11/322* (2013.01); *C09D 11/36* (2013.01); *B41J 2/01* (2013.01)

(58) Field of Classification Search
CPC ..... C09D 11/101; C09D 11/107; C09D 11/30; C09D 11/322; C09D 11/36
See application file for complete search history.

(56) References Cited

U.S. PATENT DOCUMENTS

| | | |
|---|---|---|
| 2009/0171007 A1 | 7/2009 | Jonai et al. |
| 2011/0169903 A1 | 7/2011 | Hayata et al. |
| 2015/0210874 A1 | 7/2015 | Mizutani et al. |
| 2018/0002552 A1 | 1/2018 | Nakano et al. |

FOREIGN PATENT DOCUMENTS

| | | |
|---|---|---|
| CN | 102127334 A | 7/2011 |
| EP | 2666832 A1 | 11/2013 |
| EP | 2949710 A1 | 12/2015 |
| EP | 2975092 A1 | 1/2016 |
| EP | 3778801 A1 | 2/2021 |
| JP | 2009120834 A | 6/2009 |
| JP | 2011113088 A | 6/2011 |
| JP | 2012140491 A | 7/2012 |
| JP | 2015048387 A | 3/2015 |
| JP | 2017019939 A | 1/2017 |
| WO | 2007013368 A1 | 2/2007 |
| WO | 2008045517 A2 | 4/2008 |
| WO | 2013027672 A1 | 2/2013 |

OTHER PUBLICATIONS

International Search Report (ISR) dated May 14, 2019, issued for International application No. PCT/JP2019/014486 (2 pages).
Notification Concerning Transmittal of International Preliminary Report on Patentability (PCT/IB/326) and Notification of Transmittal of Translation of the International Preliminary Report on Patentability (PCT/IB/338) dated Oct. 22, 2020, with International Preliminary Report on Patentability (PCT/IB/373) and Written Opinion of the International Searching Authority (PCT/ISA/237), for corresponding international application PCT/JP2019/014486 (23 pages).
A First Office Action issued by the State Intellectual Property Office of China dated Jan. 30, 2022, for Chinese counterpart application No. 201980024732.5 (8 pages).
Extended European Search Report (EESR) dated Dec. 2, 2021, issued for European counterpart patent application No. EP19784925.0 (7 pages).

*Primary Examiner* — Sanza L. McClendon
(74) *Attorney, Agent, or Firm* — Law Office of Katsuhiro Arai

(57) ABSTRACT

An object is to obtain a photocurable inkjet printing ink composition that demonstrates excellent preservation stability and discharge stability, good adhesion, bending tolerance property, and tackiness, and high hardness. As a solution, a photocurable inkjet printing ink composition containing photopolymerizable compounds and photopolymerization initiator is provided, wherein the photocurable inkjet printing ink composition satisfies the requirements of A to E:

A. 3,3,5-trimethyl cyclohexyl acrylate is contained by 5 to 50 percent by mass in all photopolymerizable compounds;

B. multifunctional monomers and/or multifunctional oligomers of 10° C. or lower in glass transition temperature are contained by 1 to 15 percent by mass in all photopolymerizable compounds;

C. monofunctional monomers are contained by a total of 40 percent by mass or more in all photopolymerizable compounds;

D. amino group and/or amide group-containing monomers and/or oligomers are contained; and E. the ink composition has a viscosity of 10 mPa·s or lower at 25° C.

8 Claims, No Drawings

PHOTOCURABLE INKJET PRINTING INK COMPOSITION

CROSS-REFERENCE TO RELATED APPLICATIONS

This application is the U.S. National Phase under 35 U.S.C. § 371 of International Application PCT/JP2019/014486, filed Apr. 1, 2019, which claims priority to Japanese Patent Application No. JP2018-076345, filed Apr. 11, 2018. The International Application was published under PCT Article 21(2) in a language other than English.

BACKGROUND ART

The present invention relates to a photocurable inkjet printing ink composition. To be more specific, it relates to a photocurable inkjet printing ink composition that demonstrates excellent preservation stability and discharge property of the photocurable inkjet printing ink composition itself, while also allowing for formation of a coating film having good adhesion, bending tolerance property (flexibility), and tackiness, as well as high hardness.

Having such excellent performance characteristics as drying quickly, containing no volatile solvent and thus not causing volatilization of any environmentally harmful component, and being printable on various base materials, photocurable inks are utilized in wide-ranging fields from offset printing, gravure printing, screen printing, and letterpress printing, to various types of coating applications and inkjet printing, to name a few.

In particular, photocurable inkjet printing, which provides a simple, inexpensive way of creating images regardless of the material or shape of the base material, is used in various printing fields such as logo printing, graphic printing, and photographic/image printing.

Recent years have seen the development of nozzle heads made for low viscosity for use as nozzle heads capable of discharging photocurable inkjet printing ink compositions.

When a nozzle head made for low viscosity is used, however, it becomes difficult to simultaneously achieve adaptability to the nozzle head and desired physical properties of the coating film.

One possible solution to simultaneously achieving adaptability to the nozzle head and desired physical properties of the coating film is to use oligomers of low glass transition temperatures; however, many such oligomers are highly viscous, which poses a challenge in the simultaneous achievement of adaptability to the nozzle head and desired physical properties of the coating film.

Another possible method is to use highly dilutable low-viscosity monomers to achieve lower viscosity; however, many such monomers are highly volatile low-molecular-weight compounds that are odorous and present a problem in that tackiness and other physical properties of the coating film will drop (refer to Patent Literature 1, for example). Yet another method for solving the tackiness issue is to use multifunctional monomers of high glass transition temperatures in large quantity; however, doing so leads to higher viscosity and lower discharge property, as well as lower bending tolerance property (flexibility) and adhesion.

Also, in photocurable inkjet printing ink compositions, oligomers of low glass transition temperatures are used to simultaneously achieve high bending tolerance property and other resistances of the coating film.

Many of the aforementioned oligomers of low glass transition temperatures are highly viscous, which makes it difficult, when any of heads made for low-viscosity being required in recent years is used, to simultaneously achieve adaptability to the low-viscosity head and desired physical properties of the coating film. One possible solution is to use highly dilutable low-viscosity monomers; however, many such monomers are highly volatile low-molecular-weight compounds that are odorous and negatively affect resistance and other physical properties of the coating film, especially the tackiness of the coating film. Also, while solving the issue of tacky feel requires an increase in the use quantity of multifunctional monomers of high glass transition temperatures, doing so leads to lower flexibility and adhesion of the coating film.

BACKGROUND ART LITERATURE

Patent Literature

Patent Literature 1: International Patent Laid-open No. 2007/013368

SUMMARY OF THE INVENTION

Problems to be Solved by the Invention

Accordingly, an object of the present invention is to obtain a photocurable inkjet printing ink composition for use with a nozzle head made for low viscosity, wherein such photocurable inkjet printing ink composition demonstrates excellent preservation stability and discharge stability, good adhesion, bending tolerance property, and tackiness, and low odor, because it uses 3,3,5-trimethyl cyclohexyl acrylate, combines multifunctional monomers and/or multifunctional oligomers of 10° C. or lower in glass transition temperature with amino group and/or amide group-containing monomers and/or oligomers, and is adjusted to a viscosity of 10 mPa·s or lower at 25° C.

Means for Solving the Problems

The inventors of the present invention studied in earnest to achieve the aforementioned object, and consequently invented the photocurable inkjet ink composition described below.

1. A photocurable inkjet printing ink composition containing photopolymerizable compounds and photopolymerization initiator, wherein such photocurable inkjet printing ink composition satisfies the requirements of A to E:
    A. 3,3,5-trimethyl cyclohexyl acrylate is contained by 5 to 50 percent by mass in all photopolymerizable compounds;
    B. multifunctional monomers and/or multifunctional oligomers of 10° C. or lower in glass transition temperature are contained by 1 to 15 percent by mass in all photopolymerizable compounds;
    C. monofunctional monomers are contained by a total of 40 percent by mass or more in all photopolymerizable compounds;
    D. amino group and/or amide group-containing monomers and/or oligomers are contained;
    E. the ink composition has a viscosity of 10 mPa·s or lower at 25° C.

2. The photocurable inkjet printing ink composition according to 1, wherein the monofunctional monomers among all photopolymerizable compounds are monofunctional monomers that, in a homopolymer state, have a glass transition temperature in a range of 0 to 30° C.

3. The photocurable inkjet printing ink composition according to 1 or 2, which contains amino group and/or amide group-containing monomers and/or oligomers by 5 to 45 percent by mass in all photopolymerizable compounds.

4. The photocurable inkjet printing ink composition according to any one of 1 to 3, which contains an acrylated amine compound having two photopolymerizable functional groups and two amino groups in its molecule, as well as acryloyl morpholine and/or N-vinyl caprolactam, as amino group and/or amide group-containing monomers and/or oligomers.

5. The photocurable inkjet printing ink composition according to any one of 1 to 4, wherein the content of multifunctional monomers and/or multifunctional oligomers of 40° C. or higher in glass transition temperature is 10 percent by mass or lower in all photopolymerizable compounds.

6. The photocurable inkjet printing ink composition according to any one of 1 to 5, which contains a colorant.

Effects of the Invention

According to the photocurable inkjet printing ink composition proposed by the present invention, significant effects—such as low viscosity, adaptability to low-viscosity heads, excellent hardness (pencil hardness), bending property, and surface tackiness of the coating film, and low odor—can be achieved because the ink composition contains specific photopolymerizable components.

MODE FOR CARRYING OUT THE INVENTION

The photocurable inkjet printing ink composition proposed by the present invention, which contains at least photopolymerizable compounds and photopolymerization initiator (hereinafter also referred to as "ink composition proposed by the present invention"), is explained below in detail. There are compounds that fall under two or more categories among the categories of compounds listed under A to C below. Such compounds are treated as belonging to each of these two or more categories and counted multiple times toward the contents of the respective categories.

<A. 3,3,5-Trimethyl Cyclohexyl Acrylate>

The use quantity of 3,3,5-trimethyl cyclohexyl acrylate under the present invention is in a range of 5 to 50 percent by mass, or preferably 10 to 35 percent by mass, or yet more preferably 15 to 30 percent by mass, in all photopolymerizable compounds. A content lower than 5 percent by mass tends to decrease the tackiness and increase the odor, while a content higher than 50 percent by mass tends to decrease the adhesion and bending tolerance property.

<B. Multifunctional Monomers and/or Multifunctional Oligomers of 10° C. or Lower in Glass Transition Temperature>

For the B. multifunctional monomers and/or multifunctional oligomers of 10° C. or lower in glass transition temperature under the present invention, the following compounds may be adopted, for example:

Examples include polyethylene glycol (400) diacrylate, polyethylene glycol (600) diacrylate, alkoxylated hexane diol diacrylate, ethoxylated (30) bisphenol A diacrylate, alkoxylated neopentyl glycol diacrylate, ethoxylated (3) trimethylolpropane triacrylate, ethoxylated (6) trimethylolpropane triacrylate, ethoxylated (9) trimethylolpropane triacrylate, propoxylated (3) trimethylolpropane triacrylate, triethylene glycol dimethacrylate, tetraethylene glycol dimethacrylate, polyethylene glycol (600) dimethacrylate, ethoxylated (10) bisphenol A dimethacrylate, 1,12-dodecane diol dimethacrylate, urethane acrylate oligomer, polyester acrylic oligomer, etc.

The use quantity of multifunctional monomers and/or multifunctional oligomers of 10° C. or lower in glass transition temperature under the present invention is in a range of 1 to 15 percent by mass, or preferably 4 to 12 percent by mass, or yet more preferably 6 to 10 percent by mass, in all photopolymerizable compounds. A content lower than 1 percent by mass tends to decrease the tackiness and friction resistance, while a content higher than 15 percent by mass tends to decrease the adhesion and bending tolerance property.

<C. Monofunctional Monomers>

For the monofunctional monomers including the monomer of A above and monomers classified under D as described below, the following compounds may be adopted in addition to those under A above and D below:

Butyl (meth)acrylate, isobutyl (meth)acrylate, tertiary butyl (meth)acrylate, octyl (meth)acrylate, 2-ethyl hexyl (meth)acrylate, decyl (meth)acrylate, isomyristyl (meth)acrylate, stearyl (meth)acrylate, isostearyl (meth)acrylate, isobornyl (meth)acrylate, lauryl (meth)acrylate, cyclic trimethylolpropane formal (meth)acrylate, cyclohexyl (meth)acrylate, butyl cyclohexyl acrylate, trimethyl cyclohexyl acrylate, adamantyl (meth)acrylate, dicyclopentanyl (meth)acrylate, dicyclopentenyl (meth)acrylate and other acrylates, styrene, benzyl (meth)acrylate, 2-phenoxyethyl (meth)acrylate, and ethylene oxide-modified products thereof, ethyl carbitol (meth)acrylate, 2-methoxyethyl acrylate, polyethylene glycol (meth)acrylate, isoamyl (meth)acrylate, hydroxymethyl (meth)acrylate, hydroxyethyl (meth)acrylate, hydroxypropyl (meth)acrylate, hydroxybutyl (meth)acrylate, hydroxyphenoxypropyl (meth)acrylate, 2-ethylhexyl-diglycol (meth)acrylate, 2-acryloyloxyethyl hexahydrophthalic acid, butoxyethyl acrylate, ethoxydiethylene glycol (meth)acrylate, ethyl carbitol acrylate, methoxydiethylene glycol (meth)acrylate, methoxypolyethylene glycol (meth)acrylate, methoxypropylene glycol (meth)acrylate, tetrahydrofurfuryl (meth)acrylate, (2-methyl-2-ethyl-1,3-dioxolane-4-yl) methyl (meth)acrylate, (3-ethyl oxetane-3-yl) methyl methacrylate, phenol ethylene glycol-modified acrylate, 2-hydroxypropyl (meth)acrylate, 2-hydroxy-3-phenoxypropyl (meth)acrylate, 2-acryloyloxy ethyl succinic acid, 2-acryloyloxy ethyl phthalic acid, 2-acryloyloxyethyl-2-hydroxyethyl-phthalic acid, lactone-modified flexible acrylate, t-butyl cyclohexyl (meth)acrylate, vinyloxyethoxyethyl (meth)acrylate, etc.

Monofunctional monomers are contained by a total of preferably 40 percent by mass or more, or more preferably 50 to 95 percent by mass, or yet more preferably 60 to 90 percent by mass, in all photopolymerizable compounds. If the content of monofunctional monomers is lower than 40 percent by mass, the viscosity tends to increase while the bending tolerance property tends to drop.

Also, preferably the glass transition temperatures, in a homopolymer state, of the monofunctional monomers among all photopolymerizable compounds are in a range of 0 to 30° C. from the viewpoints of the hardness (pencil hardness), bending property, and surface tackiness of the coating film.

<D. Amino Group and/or Amide Group-Containing Monomers and/or Oligomers>

For the amino group and/or amide group-containing monomers and/or oligomers under the present invention, the following compounds may be adopted, for example:

Acrylamide, acryloyl morpholine and various other (meth)acrylamide monomers, N-vinyl caprolactam and other N-vinyl amide monomers, such as CN371, CN373, CN386, CN501, CN550, and CN551 (manufactured by Sartomer, Inc.), and other acrylated amine compounds. For example, preferably an acrylated amine compound having two photopolymerizable functional groups and two amino groups in its molecule is combined with acryloyl morpholine and/or N-vinyl caprolactam.

The content of amino group and/or amide group-containing monomers and oligomers may be determined arbitrarily. From the viewpoint of hardness, however, preferably their content is 5 to 45 percent by mass in all photopolymerizable compounds. If this content is lower than 5 percent by mass, the hardness and tackiness may drop.

<E. Ink Composition Viscosity of 10 mPa·s or Lower at 25° C.>

The photocurable inkjet printing ink composition containing the photopolymerizable compounds under A to D above, as well as the photopolymerizable compounds under F below and photopolymerization initiator, photosensitizer, colorant, surface-active agent, and various other additives as necessary, must have a viscosity of 10 mPa·s or lower at 25° C. If the viscosity exceeds 10 mPa·s, discharging the ink composition from the inkjet printing nozzle may become difficult.

It should be noted that the viscosity values cited under the present invention represent viscosities measured with an E-type viscometer (product name: RE100L Viscometer, manufactured by Toki Sangyo Co., Ltd.) under the conditions of 25° C. and 20 rpm.

<F. Combinable Photopolymerizable Compounds>

For the photopolymerizable compounds that can be combined with the compounds under A to D above in the photocurable inkjet printing ink composition proposed by the present invention, the multifunctional photopolymerizable compounds whose glass transition temperature exceeds 10° C. as listed below, other than the D. amino group and/or amide group-containing monomers and/or oligomers, may be utilized:

From the viewpoint of bending property, the use quantity of multifunctional photopolymerizable compounds whose glass transition temperature is 40° C. or above, for example, is 10 percent by mass or lower, or preferably 5 percent by mass or lower, in all photopolymerizable compounds.

For these multifunctional photopolymerizable compounds, compounds having multiple carbon-carbon unsaturated bonds in the molecule, such as the following compounds, may be adopted:

Ethylene glycol di(meth)acrylate, propylene glycol di(meth)acrylate, butane diol di(meth)acrylate, hexane diol di(meth)acrylate, dipropylene glycol di(meth)acrylate, triethylene glycol di(meth)acrylate, tripropylene glycol di(meth)acrylate, and other (poly)alkylene glycol di(meth)acrylates, 1,9-nonane diol di(meth)acrylate, neopentyl glycol di(meth)acrylate, dimethylol-tricyclodecane di(meth)acrylate, neopentyl glycol hydroxypivalate di(meth)acrylate, polytetramethylene glycol diacrylate, trimethylolpropane tri(meth)acrylate, and ethylene oxide-modified products thereof, pentaerythritol tri(meth)acrylate, pentaerythritol tetra(meth)acrylate, and ethylene oxide-modified products thereof, dipentaerythritol penta(meth)acrylate and ethylene oxide-modified products thereof, dipentaerythritol hexa(meth)acrylate and ethylene oxide-modified products thereof, urethane (meth)acrylate, epoxy (meth)acrylate, polyester (meth)acrylate, pentaerythritol ethoxytetraacrylate, caprolactam-modified dipentaerythritol hexaacrylate, etc.

<Photopolymerization Initiator>

For the photopolymerization initiator, 2,4,6-trimethyl benzoyl-diphenyl-phosphine oxide, bis(2,4,6-trimethyl benzoyl)-phenyl phosphine oxide, etc., may be used.

The content of photopolymerization initiator is preferably in a range of 3 to 25 percent by mass, or more preferably in a range of 5 to 15 percent by mass, relative to the total mass of photopolymerizable components.

By adjusting this content to the aforementioned range of 3 to 25 percent by mass, the discharge property, curability, and preservation stability of the ink composition can be maintained in a well-balanced manner.

<Photosensitizer>

In the photocurable inkjet printing ink composition proposed by the present invention, a photosensitizer (compound) that has light absorbing properties primarily in the ultraviolet light wavelength range of 400 nm and higher and manifests a function to sensitize the curing reaction under light having the wavelengths in this range, may also be used together with the photopolymerization initiator, to promote the curability under ultraviolet light from a light-emitting diode (LED) light source.

Such photosensitizer may be an anthracene photosensitizer, thioxanthone photosensitizer, etc., and a thioxanthone photosensitizer is preferred. Any of these photosensitizers may be used alone or two or more types may be used together.

Specific examples include 9,10-dibutoxyanthracene, 9,10-diethoxyanthracene, 9,10-dipropoxyanthracene, 9,10-bis(2-ethylhexyloxy) anthracene, and other anthracene photosensitizers, 2,4-diethyl thioxanthone, 2-isopropyl thioxanthone, 4-isopropyl thioxanthone, and other thioxanthone photosensitizers. Representative examples of commercial products include DBA and DEA (manufactured by Kawasaki Kasei Chemicals Ltd.) for anthracene photosensitizers, and DETX and ITX (manufactured by Lambson Ltd.) for thioxanthone photosensitizers, and the like.

Preferably the content of photosensitizer is in a range of 0 to 8 percent by mass relative to the total mass of photopolymerizable components. A content exceeding 8 percent by mass is not desirable because it represents an excessive addition that no longer leads to improvement in effects.

It should be noted that, if a thioxanthone photosensitizer is used as the photosensitizer, the photocurable inkjet printing ink composition tends to yellow and take on a hue that is yellower than the color based on the pigment (inherent hue), and therefore preferably the content of such thioxanthone photosensitizer is determined as deemed appropriate for each color.

To be specific, preferably white and clear ink compositions that are more easily affected by a change in color tone do not contain any thioxanthone compound as the photosensitizer. Also, preferably magenta and cyan ink compositions that present problems if a change in hue occurs use a thioxanthone compound only to the extent that doing so does not cause problems with the hue. Also, preferably black and yellow ink compositions use a thioxanthone compound as the photosensitizer because their hue is not affected by a color change and their photopolymerizability is lower compared to ink compositions of other hues.

<Colorant>

A colorant of each hue may be added to the photocurable inkjet printing ink composition proposed by the present invention, to obtain a photocurable inkjet printing ink composition of each color.

For such colorant, any pigment or dye traditionally used in standard photocurable inkjet printing ink compositions may be used without limitation; when lightfastness property is considered, however, pigments such as organic pigments and inorganic pigments are preferred.

Organic pigments include, for example, dye rake pigments, as well as azo, benzimidazolone, phthalocyanine, quinacridone, anthraquinone, dioxazine, indigo, thioindigo, perylene, perinone, diketopyrrolopyrrole, isoindolinone, nitro, nitroso, flavanthrone, quinophthalone, pyranthrone, indanthrone, and other pigments, and the like. Inorganic pigments include carbon black, titanium oxide, red iron oxide, graphite, iron black, chrome oxide green, aluminum hydroxide, etc.

Also, specific examples of pigments for the photocurable inkjet printing ink composition proposed by the present invention are listed below by each representative hue:

First, yellow pigments for using the present invention as a yellow photocurable inkjet printing ink composition include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., or preferably C. I. Pigment Yellow 150, 155, 180, 213, etc.

Magenta pigments for using the present invention as a magenta photocurable inkjet printing ink composition include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., or preferably C. I. Pigment Red 122, 202, C. I. Pigment Violet 19, etc.

Cyan pigments for using the present invention as a cyan photocurable inkjet printing ink composition include, for example, C. I. Pigment Blue 1, 2, 3, 15, 15:1, 15:2, 15:3, 15:4, 15:6, 16, 18, 22, 27, 29, 60, etc., or preferably C. I. Pigment Blue 15:4, etc.

Black pigments for using the present invention as a black photocurable inkjet printing ink composition include, for example, carbon black (C. I. Pigment Black 7), etc.

White pigments for using the present invention as a white photocurable inkjet printing ink composition include, for example, titanium oxide, aluminum oxide, etc., or preferably titanium oxide that has been surface-treated with alumina, silica, or various other materials.

Preferably the content of colorant in the photocurable inkjet printing ink composition proposed by the present invention is 1 to 20 percent by mass relative to the total quantity of photocurable inkjet printing ink composition. If the content of colorant is lower than 1 percent by mass, the image quality of obtained printed matters tends to drop. If the content exceeds 20 percent by mass, on the other hand, the viscometric properties of the photocurable inkjet printing ink composition tend to be negatively affected.

<Pigment Dispersant>

The photocurable inkjet printing ink composition proposed by the present invention may contain a pigment dispersant, as necessary.

For the pigment dispersant, which is used to improve the pigment dispersibility and the preservation stability of the ink composition proposed by the present invention, any of traditionally used pigment dispersants may be employed without limitation, but use of polymeric dispersants is preferred, for example. Such pigment dispersants include carbodiimide dispersants, polyester amine dispersants, fatty acid amine dispersants, modified polyacrylate dispersants, modified polyurethane dispersants, multi-chain polymer nonionic dispersants, polymer ion activators, etc. Any of these pigment dispersants may be used alone, or two or more types may be used in combination.

Preferably the aforementioned pigment dispersant is contained by 1 to 200 parts by mass when the total quantity of pigment used represents 100 parts by mass. If the content of pigment dispersant is lower than 1 part by mass, the pigment dispersibility and the storage stability of the ink composition proposed by the present invention may drop. In the meantime, while the pigment dispersant may be contained by more than 200 parts by mass, doing so may not produce any difference in terms of effects. A more preferred lower limit is 5 parts by mass, while a more preferred upper limit is 60 parts by mass, for the content of pigment dispersant.

<Surface-Active Agent>

To improve its discharge stability, preferably the photocurable inkjet printing ink composition proposed by the present invention contains a silicone surface-active agent or other surface-active agent traditionally used in photocurable inkjet printing ink compositions as a surface-active agent, according to the inkjet head being used.

Specific examples of silicone surface-active agents include polyether-modified silicone oil, polyester-modified polydimethyl siloxane, polyester-modified methyl alkyl polysiloxane, etc. Any of the foregoing may be used alone, or two or more types may be used in combination. For example, BYK-315N and BYK-331, which are leveling agents, may be used.

Preferably the content of surface-active agent in the ink composition proposed by the present invention is 0.005 to 1.0 percent by mass. If this content is lower than 0.005 percent by mass, the surface tension of the photocurable inkjet printing ink composition proposed by the present invention will increase and its discharge stability from the inkjet head will drop. If the content exceeds 1.0 percent by mass, on the other hand, more bubbles will generate in the photocurable inkjet printing ink composition and its discharge stability will drop.

<Additives>

Various types of additives may be added to the photocurable inkjet printing ink composition proposed by the present invention, as necessary, to manifest various functionalities. To be specific, these additives include polymerization inhibitor, photostabilizer, surface treatment agent, antioxidant, antiaging agent, crosslinking promoter, plasticizer, preservative, pH adjuster, defoaming agent, humectant, etc. Also, non-curable resins that function as a vehicle may or may not be compounded.

The method for preparing the ink composition proposed by the present invention is not limited in any way, and it may be prepared by adding together all of the aforementioned materials and mixing them using a bead mill, three-roll mill, etc.

It should be noted that the ink composition proposed by the present invention may also be prepared by mixing the pigment, pigment dispersant, and photopolymerization components to obtain a concentrated base ink beforehand, and then adding the photopolymerizable components, photopolymerization initiator, as well as surface-active agent and other additives as necessary, to the concentrated base ink to achieve the desired chemical makeup of photocurable inkjet printing ink composition.

Preferably the base material to be printed with the ink composition proposed by the present invention is a base material constituted by flooring material, vinyl chloride, polyethylene terephthalate, polycarbonate, etc.; however, any base materials traditionally printed with photocurable inkjet printing ink compositions (paper, plastic film, capsule, gel, metal foil, glass, fabric, etc.) can be printed with the ink composition proposed by the present invention without problems.

The method for printing and curing the ink composition proposed by the present invention may specifically be a method whereby the ink composition proposed by the present invention is discharged onto a base material from an inkjet head made for low viscosity, after which the coating film of the ink composition proposed by the present invention that has landed on the base material is exposed to light and thereby cured.

For example, the discharge onto the base material (printing of images) may be implemented by supplying the ink composition proposed by the present invention to the low-viscosity-compatible printer head of the inkjet recording printer, and then discharging the ink composition from the printer head in such a way that the coating film on the base material will have a film thickness of 1 to 60 µm, for example. Also, the exposure to light and curing (curing of images) may be implemented by irradiating light onto the coating film of the ink composition proposed by the present invention that has been applied on the base material as images.

For the inkjet recording printer device with which to print the ink composition proposed by the present invention, any inkjet recording printer device equipped with a low-viscosity-accommodating inkjet head may be utilized. It should be noted that, if a continuous-type inkjet recording printer device is used, a conductivity-adding agent is further added to the ink composition proposed by the present invention to adjust its conductivity.

The light source used in the aforementioned curing of the coating film may be ultraviolet light (UV), ultraviolet light (light-emitting diode (LED)), electron beam, visible light, etc., where a light-emitting diode (LED) that generates ultraviolet light with an emission peak wavelength in a range of 350 to 420 nm is preferred from the environmental aspect.

Ultraviolet light from a light-emitting diode (LED) light source refers to "light irradiated from a light-emitting diode that generates ultraviolet light with an emission peak wavelength in a range of 350 to 420 nm."

EXAMPLES

The present invention is explained in greater detail below by citing examples, but the present invention is not limited to these examples. It should be noted that, unless otherwise specified, "percent" and "part" refer to "percent by mass" and "part by mass," respectively.

<Glass Transition Temperature Tg>

Here, the glass transition temperature Tg equals the theoretical glass transition temperature obtained by Wood's equation as shown below:

$$1/Tg = W1/Tg1 + W2/Tg2 + W3/Tg3 \ldots + Wx/Tgx \quad \text{Wood's equation:}$$

(In the equation, $Tg1$ to $Tg_x$ represent the glass transition temperatures of the homopolymers of polymerizable monomers 1, 2, 3, ..., x constituting the copolymer, respectively, while W1 to Wx represent the mass fractions of monomers 1, 2, 3, ..., x, respectively, and Tg represents the theoretical glass transition temperature. It should be noted that the glass transition temperature in Wood's equation is an absolute temperature.)

The materials used in the following Examples and Comparative Examples are listed below.

<A. 3,3,5-Trimethyl Cyclohexyl Acrylate (Manufactured by Nippon Shokubai Co., Ltd.), Tg: 43° C.>
<B. Multifunctional Monomers and/or Multifunctional Oligomers of 10° C. or Lower in Glass Transition Temperature>
   Ethoxylated (3) trimethylolpropane triacrylate (manufactured by Sartomer, Inc., Tg: −45° C.)
   Propoxylated (3) trimethylolpropane triacrylate (manufactured by Sartomer, Inc., Tg: −15° C.)
<C. Monofunctional Monomers>
   Isobornyl acrylate (Tg: 88° C.)
   Benzyl acrylate (Tg: 6° C.)
   Ethyl carbitol acrylate (Tg: −67° C.)
   Phenoxyethyl acrylate (Tg: 5° C.)
   Butyl cyclohexyl acrylate (4-tert-butyl cyclohexyl acrylate)
   Trimethyl cyclohexyl acrylate (3,3,5-trimethyl cyclohexyl acrylate) (also classified under A above)
<D. Amino Group and/or Amide Group-Containing Monomers and/or Oligomers>
   Acryloyl morpholine (Tg: 145° C.)
   Vinyl caprolactam (Tg: 90° C.)
   Oligomer of acrylated amine compound having two photopolymerizable functional groups and two amino groups in its molecule (CN371: manufactured by Sartomer Inc.)
<F. Combinable Photopolymerizable Compound>
   Hexane diol diacrylate (Tg: 105° C.)
<Photopolymerization Initiators>
   TPO: 2,4,6-trimethyl benzoyl-diphenyl-phosphine oxide
   SB-PI719: Bis(2,4,6-trimethyl benzoyl)-phenyl phosphine oxide
<Photosensitizer>
   DETX: 2,4-dietyl thioxanthone
<Polymerization Inhibitors>
   UV-5: Dioctyl maleate
   UV-22: Quinone polymerization inhibitor (manufactured by Kromachem Ltd.)
<Silicone Leveling Agents>
   BYK-315N (manufactured by BYK-Chemie GmbH)
   BYK-331 (manufactured by BYK-Chemie GmbH)
<Pigment Dispersant>
   SS32000 (SOLSPERSE 32000) (manufactured by Lubrizol Japan Limited)
<Preparation of Base Composition>

A mixture produced by compounding the pigment, pigment dispersant, and photopolymerizable components at compounding ratios (ratios by mass) of 16/6/78 was dispersed using an Eiger mill (with zirconia beads of 0.5 mm in diameter used as a medium), to obtain a base composition.

The respective components were compounded into the obtained base composition according to the compounding makeups (percent by mass) listed in Table 1, and then mixed under agitation, to obtain the photocurable inkjet printing ink compositions in Examples and Comparative Examples.

(Viscosity Measurement of Ink Composition)

The photocurable inkjet printing ink compositions obtained in the Examples and Comparative Examples were measured for viscosity using an E-type viscometer (product name: RE100L Viscometer, manufactured by Toki Sangyo Co., Ltd.) under the conditions of 25° C. in temperature and 20 rpm in rotor speed. The results are shown in Table 1 and Table 2.

(Preservation Stability)

The photocurable inkjet printing ink compositions obtained in the Examples and Comparative Examples were each taken into a glass vial which was then sealed and preserved for seven days at 70° C., after which the state of the ink composition was evaluated according to the evaluation standards below:

○: There is no thickening or sedimentation

Δ: There is thickening and sedimentation that will disappear once the vial is shaken lightly.

x: There is thickening and sedimentation that will not disappear even after the vial is shaken strongly.

(Discharge Stability)

An inkjet printing (recording) device equipped with an inkjet nozzle made for low-viscosity inks, as well as the photocurable inkjet printing ink compositions obtained in the Examples and Comparative Examples, were let stand for 24 hours in an ambient temperature of 25° C. to bring the temperatures of the inkjet printing device and ink compositions to 25° C. Thereafter, at 25° C., each ink composition was used to continuously print (print text) on PVC80 (vinyl chloride resin sheet (12 cm×18 cm), manufactured by Lintec Corporation) to evaluate the discharge stability according to the standards below:

○: Printing is not disturbed, and the ink composition can be discharged in a stable manner.

Δ: Printing is somewhat disturbed, but the ink composition can be discharged in a near-stable manner.

x: Printing is disturbed, or the ink composition cannot be discharged in a stable manner.

(Tackiness)

An inkjet printing (recording) device equipped with an inkjet nozzle made for low-viscosity inks, as well as the photocurable inkjet printing ink compositions obtained in the Examples and Comparative Examples, were let stand for 24 hours in an ambient temperature of 25° C. to bring the temperatures of the inkjet printing device and ink compositions to 25° C. Thereafter, at 25° C., each ink composition was used to continuously print (print text) on PVC80 (vinyl chloride resin sheet (12 cm×18 cm), manufactured by Lintec Corporation), after which the ink composition was cured with a UV-LED lamp manufactured by Phoseon Technology, Inc., to a cumulative UV light quantity of 180 m², with the distance between the lamp and the ink application surface kept to 2 cm. This coating film surface was touched with a finger and the subsequent state of the coating film was visually checked, to evaluate the tackiness as follows:

○: No fingerprint is left on the coating film.

Δ: A light fingerprint is left on the coating film.

x: A fingerprint is left on the coating film.

(Adhesion)

Each coating film obtained in the tackiness evaluation was cross-cut with a cutting knife, after which a cellophane tape (product name: CELLOTAPE (registered trademark), manufactured by Nichiban Co., Ltd.) was stuck to the cut area and then peeled away, to evaluate the degree of peeling of the cured film from the vinyl chloride resin sheet according to the standards below:

○: The cured film does not peel.

Δ: The cured film peels, but the peeled area is smaller than 20%.

x: The peeled area of the cured film is 20% or larger.

(Bending Tolerance Property)

Each coating film obtained in the tackiness evaluation was bent by 180 degrees in the mountain fold direction (the sheet is bent with the coating film on the outer side of the fold), and also in the valley fold direction (so that the coating film surfaces face each other on the inner side of the fold), to evaluate the bending property of the printed ink according to the evaluation standards below:

○: No line cracks or fine cracks generate in the coating film when bent.

Δ: Fine cracks generate in the coating film when bent.

x: Line cracks generate in the coating film when bent.

(Hardness)

Each coating film obtained in the tackiness evaluation was evaluated (for pencil hardness) by the pencil scratch test according to JIS K5600-5-4 as follows:

○: Hardness H or above

Δ: Hardness B to HB x: Hardness 2B or below (Odor)

The photocurable inkjet printing ink compositions obtained in the Examples and Comparative Examples were each evaluated for odor as follows:

○: There is little odor.

x: There is a lot of odor.

TABLE 1

| | Examples | | | | | | | | |
|---|---|---|---|---|---|---|---|---|---|
| | 1 | 2 | 3 | 4 | 5 | 6 | 7 | 8 | 9 |
| 3,3,5-trimethyl hexyl acrylate | 15 | 15 | 15 | 15 | 8 | 25 | 40 | 15 | 15 |
| EO (3)-modified trimethylolpropane triacrylate (−45° C.) | 8 | 8 | 8 | 8 | 8 | 8 | 8 | 8 | 8 |
| Propoxylated (3) trimethylolpropane triacrylate (−15° C.) | — | — | — | — | — | — | — | — | — |
| Hexane diol diacrylate | — | — | — | — | — | — | — | — | — |
| Amine-modified oligomer | 4 | 4 | 4 | 4 | 4 | 4 | 4 | 4 | 4 |
| Acryloyl morpholine (145° C.) | — | — | — | — | — | — | — | — | — |
| Vinyl caprolactam (90° C.) | 14.5 | 14.5 | 14.5 | 14.5 | 14.5 | 10 | 5 | 14.5 | 14.5 |
| Phenoxyethyl acrylate (5° C.) | — | — | — | — | — | — | — | — | 12 |
| Isobornyl acrylate (88° C.) | 2 | 2 | 2 | 2 | 2 | 2 | 2 | 2 | 2 |
| Benzyl acrylate (6° C.) | 26.15 | 20.3 | 21.24 | 23.52 | 33.15 | 25.65 | 11.15 | 16.15 | 16.15 |
| Ethyl carbitol acrylate (−67° C.) | 11.5 | 11.5 | 11.5 | 11.5 | 11.5 | 6.5 | 6 | 21.5 | 9.5 |
| TPO | 7 | 9 | 8.5 | 7 | 7 | 7 | 7 | 7 | 7 |
| SBPI719 | 2 | — | — | — | 2 | 2 | 7 | 2 | 2 |
| DETX | 0.1 | 0.2 | 1 | 4 | 0.1 | 0.1 | 0.1 | 0.1 | 0.1 |
| UV-5 | 2 | 2 | 2 | 3 | 2 | 2 | 2 | 2 | 2 |
| UV-22 | 0.4 | 0.4 | 0.4 | 0.4 | 0.4 | 0.4 | 0.4 | 0.4 | 0.4 |
| BYK-315N | 0.5 | 0.5 | 0.5 | 0.5 | 0.5 | 0.5 | 0.5 | 0.5 | 0.5 |
| BYK331 | 0.1 | 0.1 | 0.1 | 0.1 | 0.1 | 0.1 | 0.1 | 0.1 | 0.1 |

TABLE 1-continued

|  |  | Examples | | | | | | | | |
|---|---|---|---|---|---|---|---|---|---|---|
|  |  | 1 | 2 | 3 | 4 | 5 | 6 | 7 | 8 | 9 |
| Pigment dispersants | PB15:4 | 1.35 | — | — | — | 1.35 | 1.35 | 1.35 | 1.35 | 1.35 |
|  | PR122 | — | 2 | — | — | — | — | — | — | — |
|  | PY155 | — | — | 2 | — | — | — | — | — | — |
|  | PB7 | — | — | — | 1.3 | — | — | — | — | — |
|  | Benzyl acrylate | 4.86 | 9.7 | 7.76 | 4.66 | 4.86 | 4.86 | 4.86 | 4.86 | 4.86 |
|  | SS32000 | 0.54 | 0.8 | 1.5 | 0.52 | 0.54 | 0.54 | 0.54 | 0.54 | 0.54 |
| Total |  | 100 | 100 | 100 | 100 | 100 | 100 | 100 | 100 | 100 |
| Theoretical Tg of the polymer of monofunctional monomers other than A |  | 12 | 12 | 12 | 12 | 9 | 19 | 24 | −2 | 14 |
| Percentage of monofunctional monomers in photopolymerizable compounds |  | 86 | 86 | 86 | 86 | 86 | 86 | 85 | 86 | 86 |
| Viscosity |  | 6.8 | 7.8 | 7.7 | 8.0 | 6.0 | 9.3 | 9.8 | 8.9 | 9.1 |
| Odor |  | ○ | ○ | ○ | ○ | ○~× | ○ | ○ | ○ | ○ |
| Discharge stability |  | ○ | ○ | ○ | ○ | ○ | ○ | Δ | ○ | ○ |
| Tackiness |  | ○ | ○ | ○ | ○ | ○ | ○ | ○ | ○ | ○ |
| Adhesion |  | ○ | ○ | ○ | ○ | ○ | ○ | ○ | ○ | ○ |
| Bending tolerance property |  | ○ | ○ | ○ | ○ | ○ | ○ | ○ | ○ | ○ |
| Hardness |  | ○ | ○ | ○ | ○ | ○ | ○ | ○ | ○ | ○ |

TABLE 2

|  |  | Examples | | | | | Comparative Examples | | | | |
|---|---|---|---|---|---|---|---|---|---|---|---|
|  |  | 10 | 11 | 12 | 13 | 14 | 1 | 2 | 3 | 4 | 5 |
| 3,3,5-trimethyl hexyl acrylate |  | 15 | 15 | 11 | 15 | 15 | 4 | 55 | 15 | 15 | 11 |
| EO (3)-modified trimethylolpropane triacrylate (−45° C.) |  | 8 | — | 8 | 2 | 14 | 10 | 10 | 0.5 | 20 | 20 |
| Propoxylated (3) trimethylolpropane triacrylate (−15° C.) |  | — | 8 | — | — | — | — | — | — | — | — |
| Hexane diol diacrylate |  | — | — | — | 5 | — | — | — | — | — | 20 |
| Amine-modified oligomer |  | 4 | 4 | 4 | 4 | 4 | 4 | 4 | 4 | 4 | 12 |
| Acryloyl morpholine (145° C.) |  | 14.5 | — | 34 | — | — | — | — | — | — | — |
| Vinyl caprolactam (90° C.) |  | — | 14.5 | — | 14.5 | 14.5 | 14.5 | 10 | 14.5 | 14.5 | 7.5 |
| Phenoxyethyl acrylate (5° C.) |  | — | — | — | — | — | — | — | — | — | — |
| Isobornyl acrylate (88° C.) |  | 2 | 2 | 2 | 2 | 2 | 2 | — | 2 | 2 | 1 |
| Benzyl acrylate (6° C.) |  | 28.15 | 28.15 | 5.15 | 29.15 | 19.15 | 37.15 | — | 35.65 | 16.15 | 2.15 |
| Ethyl carbitol acrylate (−67° C.) |  | 9.5 | 9.5 | 17 | 9.5 | 12.5 | 9.5 | 2.15 | 9.5 | 9.5 | 7.5 |
| TPO |  | 7 | 7 | 7 | 7 | 7 | 7 | 7 | 7 | 7 | 7 |
| SBPI719 |  | 2 | 2 | 2 | 2 | 2 | 2 | 2 | 2 | 2 | 2 |
| DETX |  | 0.1 | 0.1 | 0.1 | 0.1 | 0.1 | 0.1 | 0.1 | 0.1 | 0.1 | 0.1 |
| UV-5 |  | 2 | 2 | 2 | 2 | 2 | 2 | 2 | 2 | 2 | 2 |
| UV-22 |  | 0.4 | 0.4 | 0.4 | 0.4 | 0.4 | 0.4 | 0.4 | 0.4 | 0.4 | 0.4 |
| BYK-315N |  | 0.5 | 0.5 | 0.5 | 0.5 | 0.5 | 0.5 | 0.5 | 0.5 | 0.5 | 0.5 |
| BYK-331 |  | 0.1 | 0.1 | 0.1 | 0.1 | 0.1 | 0.1 | 0.1 | 0.1 | 0.1 | 0.1 |
| Pigment dispersants | PB15:4 | 1.35 | 1.35 | 1.35 | 1.35 | 1.35 | 1.35 | 1.35 | 1.35 | 1.35 | 1.35 |
|  | PR122 | — | — | — | — | — | — | — | — | — | — |
|  | PY155 | — | — | — | — | — | — | — | — | — | — |
|  | PB7 | — | — | — | — | — | — | — | — | — | — |
|  | Benzyl acrylate | 4.86 | 4.86 | 4.86 | 4.86 | 4.86 | 4.86 | 4.86 | 4.86 | 4.86 | 4.86 |
|  | SS32000 | 0.54 | 0.54 | 0.54 | 0.54 | 0.54 | 0.54 | 0.54 | 0.54 | 0.54 | 0.54 |
| Total |  | 100 | 100 | 100 | 100 | 100 | 100 | 100 | 100 | 100 | 100 |
| Theoretical Tg of the polymer of monofunctional monomers other than A |  | 21 | 15 | 35 | 14 | 11 | 7 | 41 | 14 | 16 | 11 |
| Percentage of monofunctional monomers in photopolymerizable compounds |  | 86 | 86 | 86 | 87 | 81 | 84 | 84 | 95 | 72 | 39.5 |
| Viscosity |  | 8.9 | 7.1 | 8.7 | 6.9 | 8.3 | 6.3 | 11.5 | 7.3 | 9.2 | 9.6 |
| Odor |  | ○ | ○ | ○ | ○ | ○ | × | ○ | × | ○ | ○ |
| Discharge stability |  | ○ | ○ | ○ | ○ | ○ | ○ | × | ○ | ○ | Δ |
| Tackiness |  | ○ | ○ | ○ | Δ | ○ | Δ | ○ | × | ○ | ○ |
| Adhesion |  | ○ | ○ | ○ | ○ | Δ | ○ | ○ | ○ | × | × |
| Bending tolerance property |  | ○ | ○ | ○ | ○ | Δ | ○ | ○ | ○ | × | × |
| Hardness |  | ○ | ○ | ○ | Δ | ○ | ○ | ○ | × | ○ | ○ |

According to the results of the Examples, photocurable inkjet printing ink compositions having appropriate viscosity, little odor, as well as excellent discharge stability, tackiness, adhesion, bending tolerance property, and hardness, were obtained.

By contrast, Comparative Example 1 with a lower content of A. 3,3,5-trimethyl cyclohexyl acrylate resulted in strong odor and slightly worsened tackiness, while Comparative Example 2 with a higher content of A. 3,3,5-trimetyl cyclohexyl acrylate led to high viscosity and poor discharge stability. Also, Comparative Example 3 with a lower content of B. multifunctional monomers and/or multifunctional oligomers of 10° C. or lower in glass transition temperature exhibited strong odor, poor tackiness, and lower cured hardness, while Comparative Example 4 with a higher content of B. multifunctional monomers and/or multifunctional oligomers of 10° C. or lower in glass transition temperature resulted in poor adhesion and bending tolerance property.

Furthermore, a content of C. monofunctional monomers of lower than 40 percent by mass resulted in slightly worsened discharge stability as well as poor adhesion and bending tolerance property.

It should be noted that all of the Examples and Comparative Examples received a "○" in preservation stability.

What is claimed is:

1. A photocurable inkjet printing ink composition containing photopolymerizable compounds and photopolymerization initiator, the photocurable inkjet printing ink composition satisfying requirements of A to E:
   A. 3,3,5-trimethyl cyclohexyl acrylate is contained by 5 to 50 percent by mass in all photopolymerizable compounds;
   B. multifunctional monomers and/or multifunctional oligomers of 10° C. or lower in glass transition temperature are contained by 1 to 15 percent by mass in all photopolymerizable compounds;
   C. monofunctional monomers are contained by a total of 40 percent by mass or more in all photopolymerizable compounds;
   D. an acrylated amine compound having two photopolymerizable functional groups and two amino groups in its molecule, as well as acryloyl morpholine and/or N-vinyl caprolactam, as amino group and/or amide group-containing monomers and/or oligomers;
   E. the ink composition has a viscosity of 10 mPa·s or lower at 25° C.
   said photocurable inkjet printing ink composition further comprising multifunctional monomers and/or multifunctional oligomers of 40° C. or higher in glass transition temperature by 10 percent by mass or lower relative to all photopolymerizable compounds.

2. The photocurable inkjet printing ink composition according to claim 1, wherein the monofunctional monomers among all photopolymerizable compounds are monofunctional monomers that, in a homopolymer state, have a glass transition temperature in a range of 0 to 30° C.

3. The photocurable inkjet printing ink composition according to claim 1, which contains amino group and/or amide group-containing monomers and/or oligomers by 5 to 45 percent by mass in all photopolymerizable compounds.

4. The photocurable inkjet printing ink composition according to claim 1, which contains a colorant.

5. The photocurable inkjet printing ink composition according to claim 2, which contains amino group and/or amide group-containing monomers and/or oligomers by 5 to 45 percent by mass in all photopolymerizable compounds.

6. The photocurable inkjet printing ink composition according to claim 2, which contains a colorant.

7. The photocurable inkjet printing ink composition according to claim 3, which contains a colorant.

8. The photocurable inkjet printing ink composition according to claim 5, which contains a colorant.

* * * * *